Sept. 7, 1937.    J. C. CURTIS    2,092,530
ROCK DRILL
Filed April 23, 1936
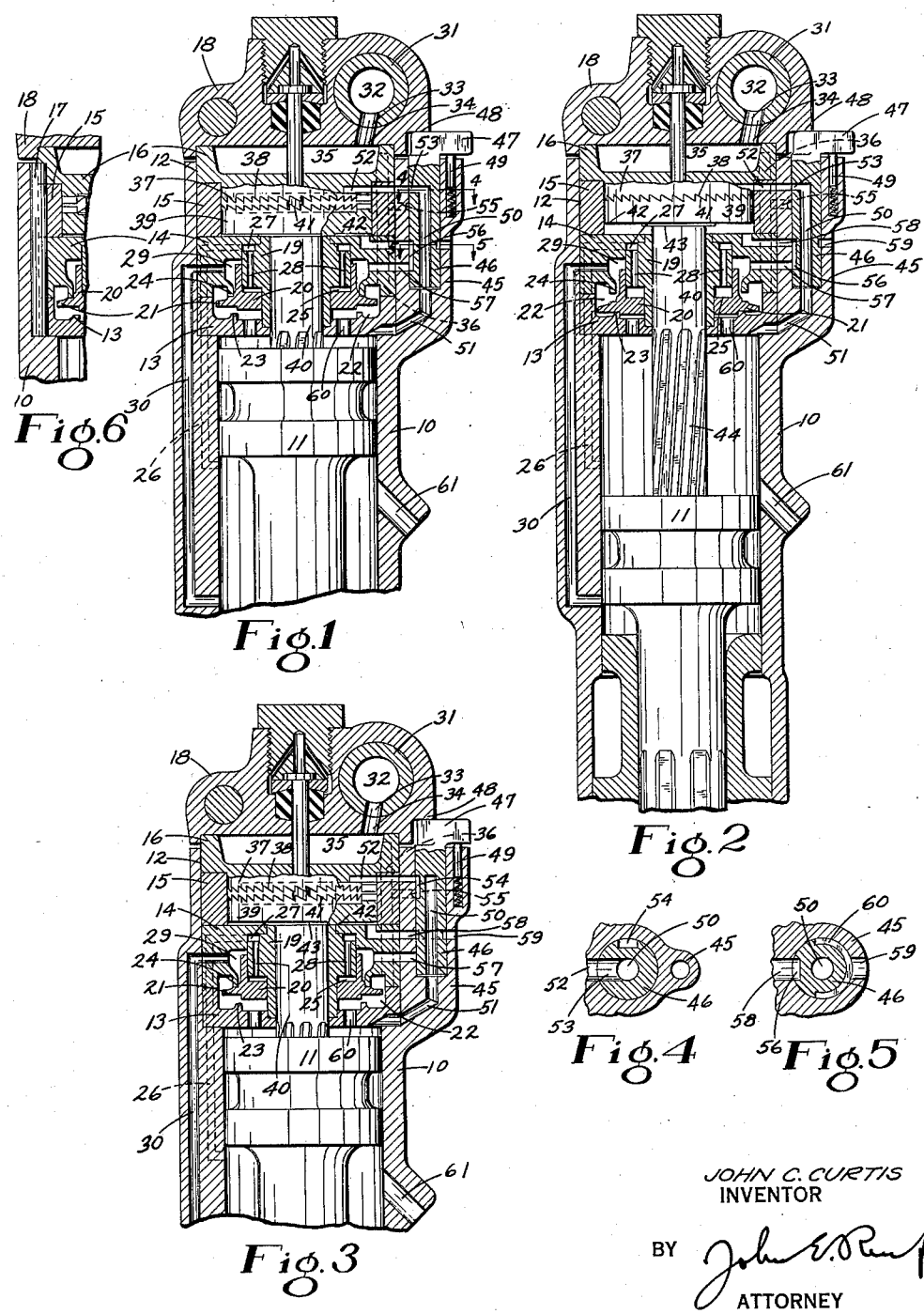
JOHN C. CURTIS
INVENTOR Patented Sept. 7, 1937

2,092,530

UNITED STATES PATENT OFFICE 2,092,530

ROCK DRILL

John C. Curtis, Garfield Heights, Ohio, assignor to The Cleveland Rock Drill Company, Cleveland, Ohio, a corporation of Ohio Application April 23, 1936, Serial No. 76,001

3 Claims. (Cl. 121—7)

This invention relates broadly to rock drills, but more particularly to a rotation mechanism for fluid actuated rock drills of the percussive type.

One object of this invention is to produce an improved rotation mechanism for rock drills, the mechanism having a reduced number of parts and affording a simple construction which is strong, durable and efficient.

Other objects of this invention will be apparent from the following detailed description wherein similar characters of reference designate corresponding parts and wherein:

Fig. 1 is an elevational sectional view of a rock drill having the invention applied thereto.

Figs. 2 and 3 are views similar to Fig. 1 illustrating some of the parts in different position.

Fig. 4 is an enlarged cross sectional view taken in a plane indicated by line 4—4 in Fig. 1.

Fig. 5 is an enlarged cross sectional view taken in a plane indicated by line 5—5 in Fig. 1.

Fig. 6 is a portion of an elevational sectional view, illustrating details of construction.

Referring to the drawing, 10 represents the cylinder of a rock drill having a piston 11 reciprocable therein for delivering blows to a tool implement (not shown). The upper end of the cylinder 10 is formed with a relatively deep counterbore 12 having disposed therein a valve cap 13, valve casing 14, ring 15 and bearing plate 16. These four parts are locked against rotation relative to the cylinder by means of a dowel pin 17, and against relative longitudinal movement by a back head 18 rigidly secured to the cylinder 10 by the usual bolts or side rods (not shown). Located within the valve cap 13 and valve casing 14, there is a valve bushing 19 having a valve 20 slidable thereon. This valve is formed with an annular flange 21 extending into an annular groove 22 provided within the valve cap 13 and valve casing 14 adjacent two annular valve seats 23 and 24 with which the valve flange 21 is capable of alternative engagement. The upper portion of the valve 20 is formed with a counterbore, the bottom 25 thereof constituting a valve kicking area on which motive fluid may be admitted from the cylinder 10 through a kicker port 26, groove 27, and ports 28 provided within the valve bushing 19. Within the valve casing 14, above the annular groove 22, there is another annular groove 29 capable of communication with the front end of the cylinder 10 through a port 30.

The back head 18 is properly machined to rotatably receive a throttle valve 31 formed with a central bore 32 having motive fluid admitted therein, and a radial port 33 affording the communication of the bore 32 with a port 34 formed within the back head 18. This last port opens into an enlarged chamber 35 provided within the bearing plate or clutch member 16, which chamber is in communication with the annular groove 22 through a plurality of ports 36.

The clutch member 16 has a reduced portion 37 extending partway into the ring 15, and has its end wall shaped in an annular ridge provided with radially disposed ratchet teeth 38. Slidably and rotatably mounted within the ring 15 below the clutch member 37, there is the cylindrical head 39 of a stem 40. This head has its upper end wall also provided with radially disposed ratchet teeth 41 engageable with the teeth 38 of the clutch member 16. The lower side 42 of the head 39 is provided with a relatively small annular shoulder 43 engageable with the upper end wall of the valve casing 14, and thereby affording an annular clearance between the latter and the lower wall 42 of the head 39.

The stem 40 extends through the bushing 19 into the cylinder 10, where it is provided with helical splines 44 engageable with similar splines formed within the piston 11.

Disposed on one side of the cylinder 10, there is a boss 45 having rotatable therein a cylindrical valve 46 which may be rotated by a handle 47 formed integrally therewith. This valve is held against longitudinal movement by the back head 18 overlapping the same as at 48. To maintain the valve 46 against accidental rotation, there is in the wall of the cylinder 10, a spring pressed plunger 49 which is constantly urged into detents formed under the valve handle 47. The valve 46 is provided with a central port 50, which is in constant communication with the rear end of the cylinder 10 through a port 51. The valve port 50 is also capable of communication with the lower wall of the clutch member 16 through a port 52 and radially disposed valve port 53. Disposed at substantially right angles from the port 53, the peripheral wall of the valve 46 is carved to form a longitudinal slot 54 affording the communication of the port 52 with a port 55 opening into the port 36. Directly below the valve port 53, the peripheral wall of the valve is formed with another slot 56, which is capable of affording the communication of two ports 57 and 58, the former leading into the annular groove 29, while the latter leads to the lower wall 42 of the head 39. Diametrically opposed to the port 58, the cylinder boss 45 is provided with a port 59 leading from the valve 46 to the atmosphere. The communication of this last port with the port 58 may be established through a partly annular groove 60 formed on the valve 46.

Leading from the annular groove 22 into the rear end of the cylinder 10, there is a plurality of ports 60, and from the cylinder to the atmosphere, there is an exhaust port 61.

The operation of the mechanism is as follows: Assuming that the throttle valve 31 and cylindrical valve 46 are positioned as shown in Fig. 1, the motive fluid from the throttle valve bore 32 will flow into the enlarged chamber 35 through the ports 33 and 34. From this last chamber, it will be admitted into the annular groove 22 via the ports 36, thus acting on the front end wall of the valve 20 to maintain the same in the position shown in Fig. 1. From the annular groove 22, the motive fluid is free to flow into the rear end of the cylinder 10 through the ports 60, thus acting on the piston 11 to drive the latter forwardly for delivering a blow to the tool implement mounted within the front end of the machine. With the valve 46 positioned as shown in Fig. 1, motive fluid from the rear end of the cylinder is also admitted through the port 51, valve ports 50 and 53, and port 52, between the clutch member 16 and the head 39 of the stem 40, thus maintaining the teeth 41 of the latter out of engagement with the teeth 38 of the clutch member 16, and thereby permitting a free rotation of the stem 40. During the downward movement of the piston 11, the latter instead of rotating due to its interengagement with the helical splines 44, will cause a partial revolution of the stem 40.

When the piston 11 uncovers the kick port 26, motive fluid will flow from inside of the cylinder 10 through the port 26, annular groove 27, and ports 28, to the kicking area 25 of the valve 20, thus tending to shift the valve forwardly. Subsequently, the piston 11 uncovering the exhaust port 61 will allow the motive fluid within the rear end of the cylinder to escape to the atmosphere, thus causing a drop of pressure on the forward end wall of the valve, and causing the latter to assume the position shown in Fig. 2. Simultaneously the motive fluid previously admitted between the clutch member 16 and head 39 is also free to exhaust via the ports 52, 53, 50, 51, and exhaust port 61.

With the valve 20 in the position shown in Fig. 2, motive fluid from the annular groove 22 will flow around the valve in the annular groove 29, to act on the end of the valve 20 for maintaining it in its forward position. From the groove 29, the motive fluid will also flow into the front end of the cylinder 10 through the port 30. In this instance, motive fluid will also flow to the front end wall 42 of the stem head 39 via the port 57, slot 56 and port 58, thus acting on the head 39 to drive and maintain it in the position shown in Fig. 2, that is, with its teeth 41 in operative engagement with the teeth 38 of the stationary clutch member 16 for locking the stem 40 against rotation. The motive fluid admitted into the front end of the cylinder 10 through the port 30 and acting on the piston 11, will drive the latter rearwardly. Due to the interengagement of the piston with the helical splines 44 of the now stationary stem 40, the former during its rearward movement will be forced to rotate, thus imparting rotation to the tool implement to move it in a new position preparatory to the delivery of a subsequent blow by the piston 11.

During the rearward travel of the piston 11, the latter will uncover the exhaust port 61, thus allowing the motive fluid admitted into the front end of the cylinder to escape to the atmosphere, and causing a drop of pressure of the motive fluid admitted into the annular groove 29. Toward the end of the rearward travel of the piston 11, the motive fluid remaining within the rear end of the cylinder will be compressed by the piston and will act on the forward end wall of the valve 29 through the ports 60 to shift the valve into the position shown in Fig. 1. In this instance, the motive fluid previously admitted into the annular groove 29 is cut off to the valve 20 engaging the valve seat 24, thus allowing the motive fluid previously admitted on the lower end wall 42 of the stem head 39 to escape therefrom via the port 58, slot 56, port 57, annular groove 29 and port 30, and thereby completing the cycle of operation.

When it is desired to use the machine without imparting rotation to the tool implement, the cylindrical valve 46 may be positioned as shown in Fig. 3. In this instance, it will be noted that the lower end wall 42 of the stem head 39 is constantly in communication with the atmosphere through the port 58, valve groove 60 and port 59. Simultaneously, motive fluid from the inlet port 36 is constantly admitted between the clutch member 16 and head 39, through the port 55, valve slot 54 and port 52, thus constantly acting on the head 39 of the stem 40 for maintaining the teeth 41 of the former out of engagement with the teeth 38 of the clutch member 16, and thereby allowing the rifled stem 40 to rotate irrespectively of the position of the valve 20.

Although the foregoing description is necessarily of a detailed character in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a fluid actuated rock drill, the combination of a housing having a piston reciprocable therein, a longitudinally and rotatably movable rifle bar in interlocking engagement with said piston, opposed actuating areas on said bar one being larger than the other, a valve automatically operable for controlling the admission of the motive fluid into said housing for effecting the reciprocation of said piston, stationary means with which said bar is engageable for locking the same against rotation, means including passages for alternatively admitting and exhausting motive fluid to and from the actuating areas of said bar for longitudinally actuating the same in time relation with the reciprocation of said piston into engagement or disengagement with said stationary means for preventing or permitting the rotation of the bar, and a valve controlling said passages movable into one position for constantly admitting pressure fluid to the larger of said actuating areas for maintaining said bar out of engagement with said stationary means.

2. In a fluid actuated rock drill, the combination of a housing having a fluid actuated piston reciprocable therein, a reciprocable and rotatable rifle bar in interlocking engagement with said piston, opposed actuating areas on said bar, clutch means with which said bar is engageable for locking the same against rotation, and means for alternatively admitting and exhausting motive fluid to and from said actuating areas for normally effecting the reciprocation of said bar and the consequential engagement or disengagement of the latter with said clutch means and valve means operable for constantly admitting motive fluid to one of said actuating areas and simultaneously exhausting the motive fluid from the other of said actuating areas for maintaining said bar out of engagement with said clutch means irrespective of the reciprocation of said piston.

3. In a fluid actuated rock drill, the combination of a housing having a fluid actuated piston reciprocable therein, a rotatable rifle bar in interlocking engagement with said piston, clutch means with which said rifle bar is engageable for locking the same against rotation, opposed actuating areas on said bar means including passages for alternatively admitting and exhausting motive fluid to and from said actuating areas for normally effecting the engagement and disengagement of said bar with said clutch means during the normal reciprocation of said piston, and means for selectively admitting motive fluid to one of said actuating areas and exhausting the motive fluid from the other of said actuating areas for maintaining said bar out of engagement with said clutch means irrespective of the reciprocation of said piston.

JOHN C. CURTIS.